United States Patent [19]
Litwicki

[11] Patent Number: 5,106,150
[45] Date of Patent: Apr. 21, 1992

[54] ROOF STRUCTURE FOR TOY VEHICLE

[75] Inventor: Mary K. Litwicki, Dallas, Tex.

[73] Assignee: Spang & Co., Butler, Pa.

[21] Appl. No.: 477,778

[22] Filed: Feb. 9, 1990

[51] Int. Cl.⁵ ............................................. B60J 7/08
[52] U.S. Cl. ................................... 296/216; 296/220; 296/177; 446/470
[58] Field of Search ............... 296/107, 177, 216, 220; 446/470; 280/288.2; D12/156

[56] References Cited

U.S. PATENT DOCUMENTS

| | | | |
|---|---|---|---|
| 2,462,667 | 2/1949 | O'Neal | 296/107 |
| 3,347,592 | 10/1967 | Renneker | 296/107 |
| 4,165,122 | 8/1979 | Bertone | 296/216 X |
| 4,709,958 | 12/1987 | Harrod | 296/177 |
| 4,750,778 | 6/1988 | Hoban | 296/216 X |
| 4,805,956 | 2/1989 | Saunders | 296/216 X |
| 4,950,022 | 8/1990 | Pattee | 296/216 X |

FOREIGN PATENT DOCUMENTS 0253632 1/1988 European Pat. Off. ............ 296/216
1040888 9/1966 United Kingdom ................. 446/470

OTHER PUBLICATIONS

Automotive Industries, Feb. 1990, p. 52 "Let the Sun Shine In!".

*Primary Examiner*—Dennis H. Pedder
*Attorney, Agent, or Firm*—Kirkpatrick & Lockhart

[57] ABSTRACT

A roof structure for a toy vehicle is disclosed. The roof structure includes a pair of upstanding members attached to the one end of the vehicle's body. An inverted U-shaped frame having a horizontal crossmember is provided on the opposite end of the vehicle's body. A roof panel is pivotally connected at one end thereof between the upstanding members. In addition, a slide panel is provided in the roof panel to open or close a central opening therein. The roof panel may be pivotally moved between a horizontal position resting on the crossmember and a retracted position between the upstanding members while the slide panel may be optionally opened or closed.

4 Claims, 7 Drawing Sheets

ROOF STRUCTURE FOR TOY VEHICLE

BACKGROUND OF THE INVENTION

1. Field of the Invention

The present invention relates to toy riding vehicles and, in particular, to an opening roof structure for a toy vehicle.

2. Description of the Prior Art

Perhaps some of the fondest memories of most people's childhood toys, which are regularly revived when one sees today's toys, involve riding vehicles which surround a child. Those vehicles usually take the forms of cars, trucks, construction vehicles, even boats and airplanes, in which a child may sit. Often, such toy vehicles are made from plastic or metal and have a rigidly secured roof which overlies the passenger compartment. Alternatively, the vehicle may have no roof or possibly a simulated, non-functional, permanently open version of a folded convertible top.

However, previous and current toy vehicles do not have a roof structure which includes a retractable sunroof or a folding roof which opens to expose the area above the passenger compartment. It would appear that those features would further increase the childhood fun of playing with a toy riding vehicle.

The subject invention is directed toward a roof structure for a toy riding vehicle, such as a car, which provides an opening sunroof in a retractable roof panel.

SUMMARY OF THE INVENTION

In accordance with the present invention, there is provided a moveable roof structure for a toy riding vehicle. Such vehicles, for example, comprise a car or a truck which is large enough to include a passenger compartment and are constructed from typical materials for large toys, such as appropriate plastics or metals. Often, such vehicles have an open floor so that the vehicle may be moved by the child's feet directly engaging the ground. Alternatively, manually or power driven wheels and steerable wheels may be provided.

In any event, the vehicle includes a body defining a passenger compartment. A windshield-defining forward frame having a horizontal upper crossmember is provided on the front of the vehicle. In addition, two parallel upstanding rear members are attached to the rear of the vehicle and define an open area therebetween. A retractable roof member is pivotally connected at one end to the rear uprights and, at its other end, may rest on the horizontal bar of the forward frame. An opening is provided centrally of the roof member which may be closed by a panel which is parallel to and slides into and out of the body of the roof member.

Accordingly, the present invention provides a roof structure for a toy vehicle which includes a panel which may be completely closed above the passenger compartment, or may provide an opening sunroof effect or may be pivotally folded to a retracted position to provide a completely open area above the passenger compartment.

These and other details, objects and advantages of the invention will become apparent as the following description of the present preferred embodiment thereof proceeds.

BRIEF DESCRIPTION OF THE DRAWINGS

In the accompanying drawings, there is shown a present preferred embodiment of the invention, wherein.

DETAILED DESCRIPTION OF THE PREFERRED EMBODIMENT

Figure 1:
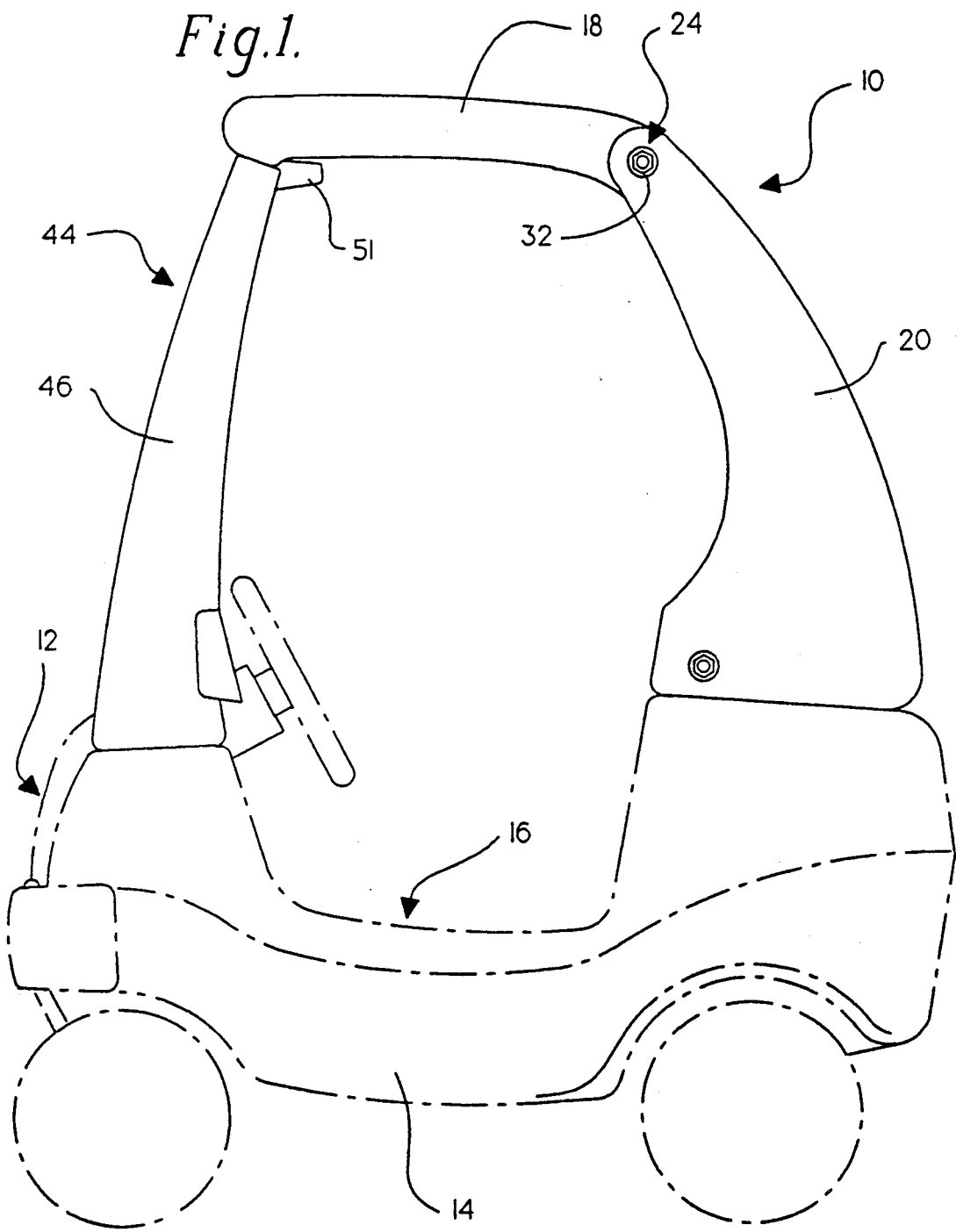
FIG. 1 is a side elevation view of the roof structure for a toy vehicle as configured with the body of a vehicle shown in phantom lines.
Figure 2:
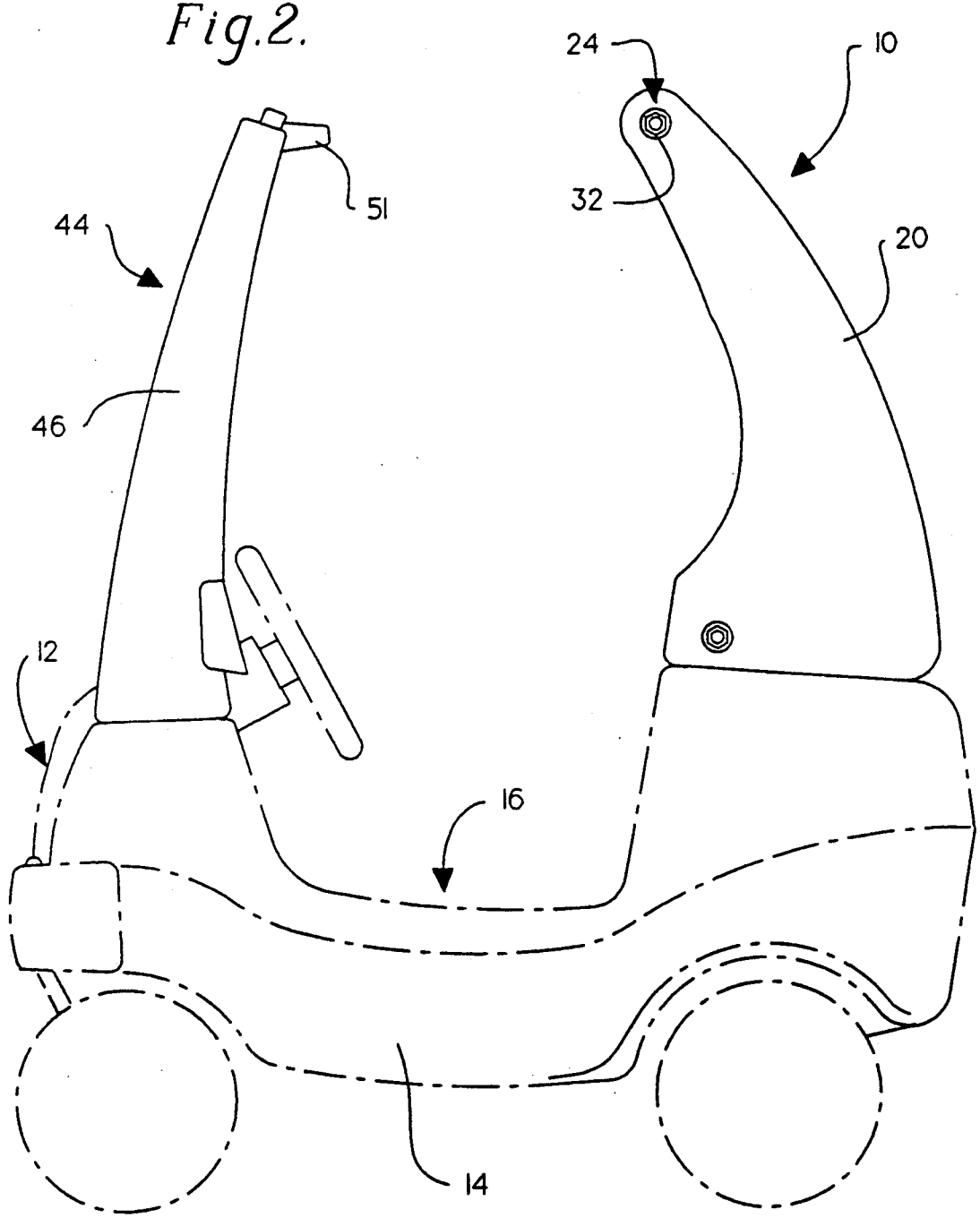
FIG. 2 is a side elevation view of the toy roof structure according to the present invention in its open configuration.
Figure 3:
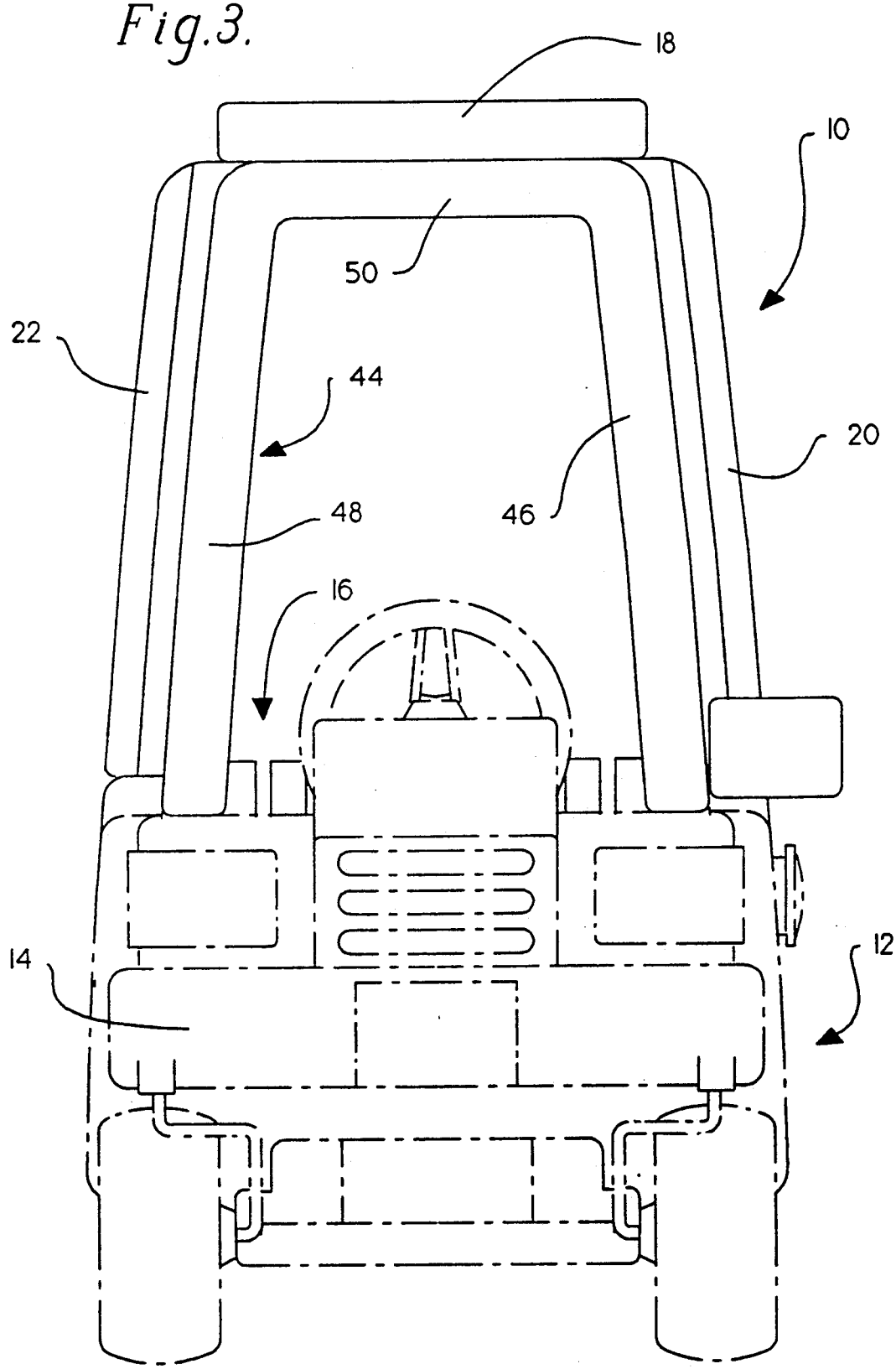
FIG. 3 is an end elevation view of the roof structure of the invention.
Figure 4:
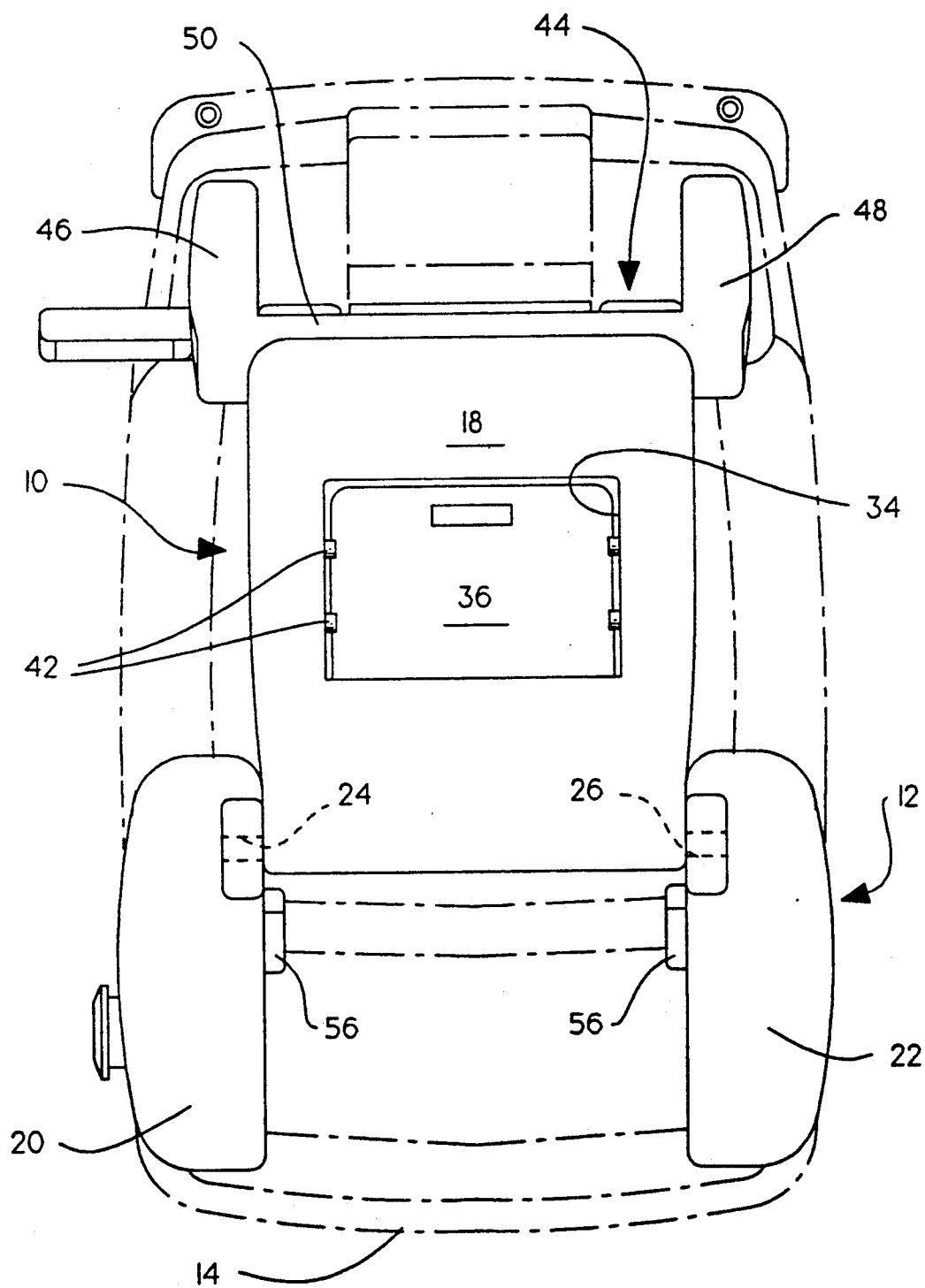
FIG. 4 is a plan view of the roof structure of the invention in its fully closed condition.
Figure 5:
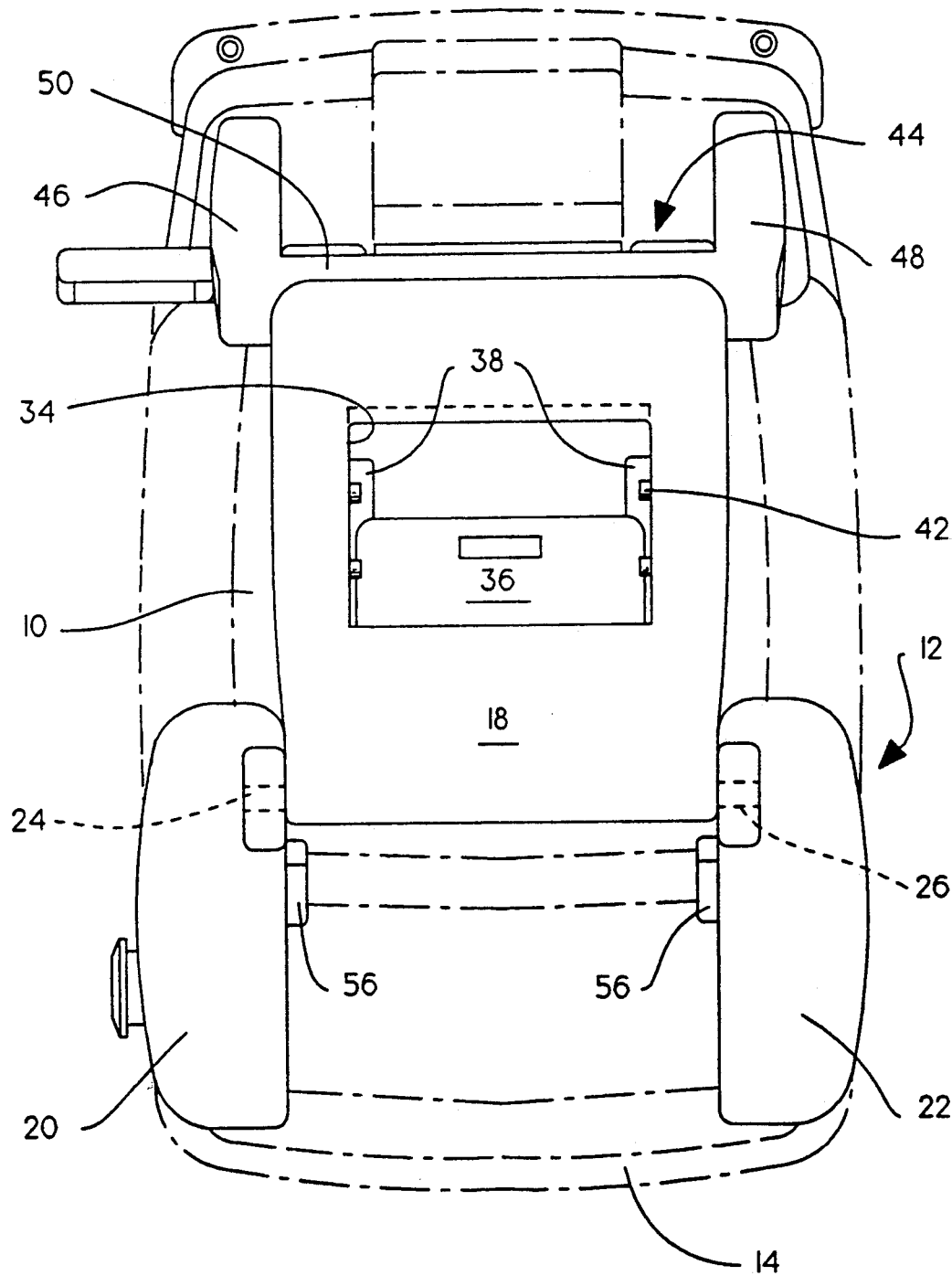
FIG. 5 is a plan view of the roof structure of the invention with the sliding panel in a partially retracted condition.
Figure 6:
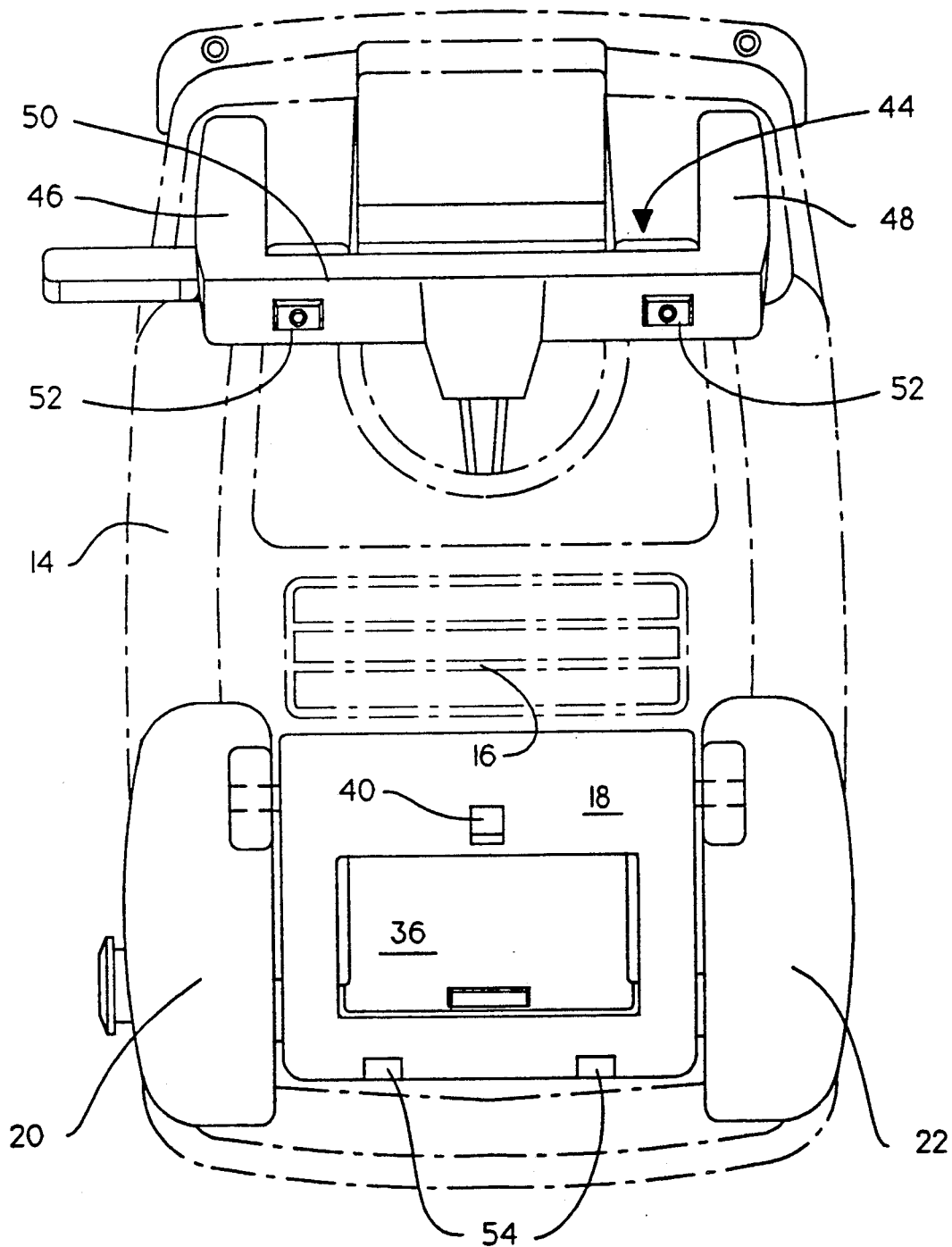
FIG. 6 is a plan view of the roof structure of the present invention in its fully retracted position.
Figure 7:
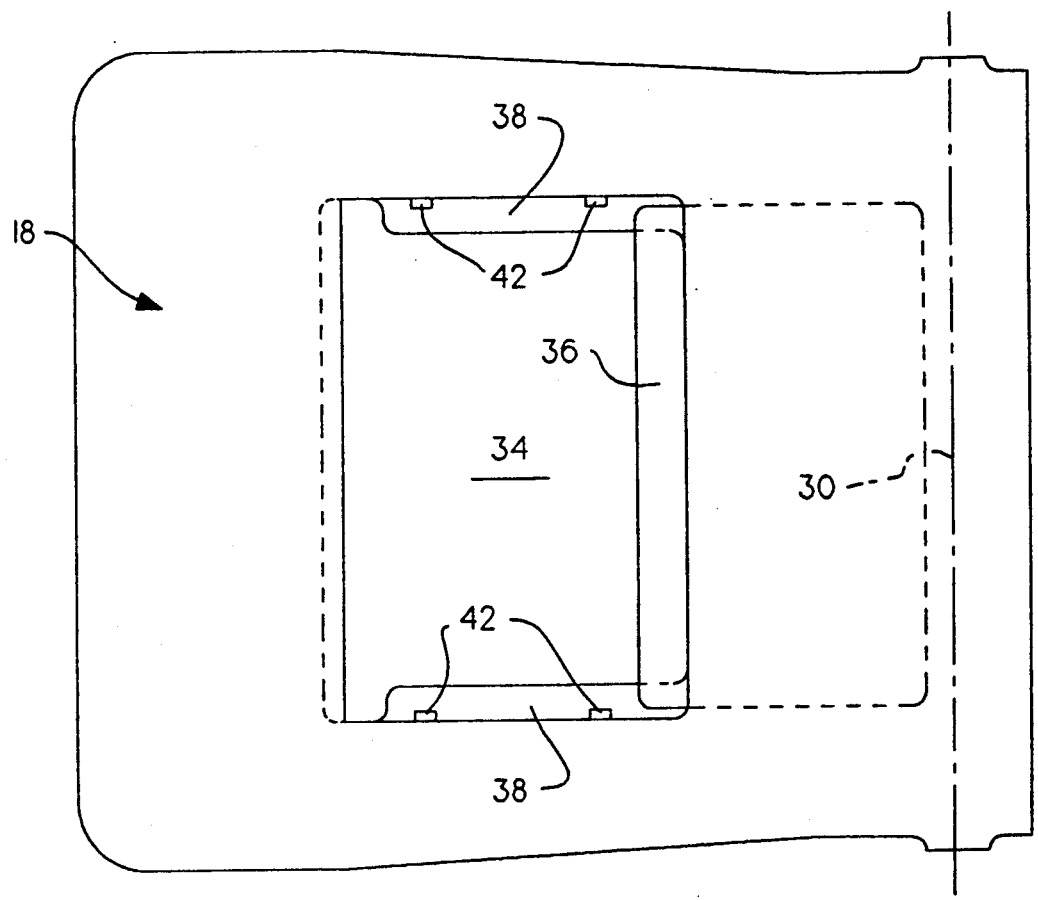
FIG. 7 is a plan view of the roof panel of the invention.
Figure 8:
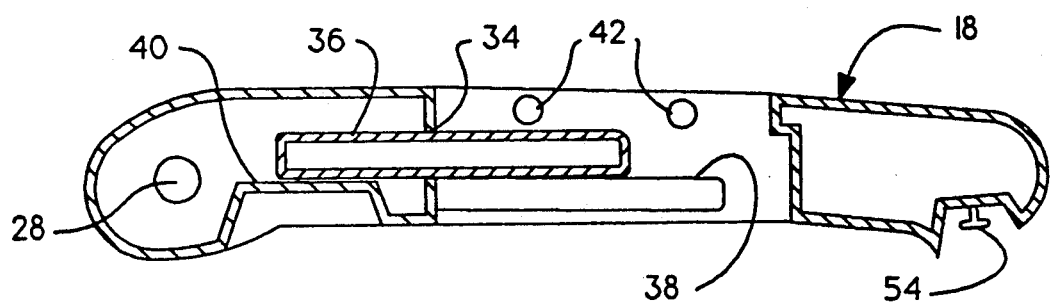
FIG. 8 is a side sectional view of the roof panel according to the instant invention.

Referring now to the drawings wherein the showings are for purposes of illustrating the present preferred embodiment of the invention only and not for purposes of limiting same, the figures show a roof structure 10 for a toy vehicle, generally shown as 12. While the roof structure 10 may be employed in connection with any vehicle, it is preferably applied to a toy vehicle and, most preferably, to a toy vehicle having a body 14 which defines a passenger compartment 16 in which a child may sit. It will be appreciated by those skilled in the art that such a vehicle may comprise any form of a toy vehicle on which a roof is intended, such as a car, truck, construction vehicle, boat or airplane. Further, the vehicle may be constructed from any known material from which any toy vehicles are constructed such as plastics or metals. For purposes of the instant specification, reference will be made to a toy car 12 formed from a plastic material.

The roof 10 includes a roof panel 18 which is supported on the body 14 by a means of left and right upstanding supports 20 and 22, respectively. The upstanding supports 20 and 22 preferably comprise slightly curved members which may be attached to the body by traditional means such as bolting. Apertures 24 and 26, respectively, are provided laterally horizontally through upstanding supports 20 and 22, respectively.

The roof panel 18 is generally a hollow member and includes apertures 28 provided through rear side portions thereof. A rod 30 is passed through one of the apertures 24 or 26 in the upstanding supports 20 or 22, respectively, through the apertures 28 and the body of the roof panel 18 and through the other aperture 24 or 26, as the case may be, and secured by fasteners 32 on the ends of the rod 30. By virtue of this construction, the roof panel 18 is pivotally supported by the upright supports 20 and 22.

The roof panel 18 defines a central open area 34 which, it will be appreciated, serves as a "sunroof opening". The open area 34 may be closed by means of a sliding panel 36. The sliding panel 36 is supported in its closed position in roof panel 18 by means of ledges 38 formed on the sides of the roof panel 18 defining the open area 34. The sliding panel is supported in its open position in roof 18 by means of a raised member 40 which is formed as a depression in the underside of roof panel 18. In addition, in order to prevent the removal of sliding panel 36 from roof panel 18, rollers 42 are provided above the ledges 38.

The front of roof panel 18 is supported in its closed position on a support frame 44 which is attached to the front of vehicle body 14. Support frame 44 preferably comprises an inverted U-shaped member having left and right uprights 46 and 48, respectively, and a horizontal crossmember 50 having a support ledge 51. Further, receptacles 52 are preferably provided on raised areas of the crossmember 50 to receive spring plugs 54 having laterally extending spring arms which engage the receptacles 52. As such, when the roof panel 18 is in its closed position, the opening thereof is resisted by the engagement of spring plugs 54 with the receptacles 52. When the roof panel 18 is folded open, it is received between the upstanding supports 20 and 22, respectively, and is retained in that position by catches 56 formed on the inner side thereof.

It will be appreciated that the roof structure 10 may be employed in various configurations to further enhance a child's enjoyment of the vehicle 12. For example, the roof panel 18 may be disposed in a substantially horizontal position resting on crossmember 50 and thereby covering the passenger compartment 16. The sliding panel 36 may then be closed or slidably received within the roof panel 16. Alternatively, the roof panel 16 may be pivotally displaced until it is received between the upstanding supports 20 and 22, respectively, and retained by catches 56.

It will be understood that various changes may be made in the details, materials and arrangements of parts which have been herein described and illustrated in order to explain the nature of the invention may be made by those skilled in the art within the principle and scope of the invention as expressed in the appended claims.

I claim:

1. A roof structure for a toy vehicle having a vehicle body, comprising:
   a. a pair of upstanding support members with one upstanding support member being attached to each rear lateral side of the vehicle body of said toy vehicle;
   b. a front support element having upwardly extending legs attached at one end thereof to the front of said vehicle body, which legs are connected at the other ends thereof to a horizontal cross member; and
   c. a roof panel having a front end and a rear end, and hinge means attached to said roof panel, said hinge means having an axis intermediate said front and said rear ends, said hinge means pivotally connecting said roof panel to said upstanding support members, said roof panel being displaceable between a first position in which the front end thereof rests on said horizontal cross member and a second position in which said front end and rear end are received between said upstanding support members by pivoting about said axis.

2. The roof structure of claim 1 in which said roof panel has an opening centrally disposed relative thereto and said roof panel further comprises a slide panel supported for movement relative to said roof panel between one position in which said slide panel closes said opening and second position in which said slide panel is substantially retracted into said roof panel thereby opening said opening.

3. The roof structure of claim 1 further comprising means for positively retaining said roof panel in said first position.

4. The roof structure of claim 1 further comprising means for positively retaining said roof panel in said second position.

* * * * *